United States Patent
Cryan et al.

(10) Patent No.: US 6,612,753 B1
(45) Date of Patent: Sep. 2, 2003

(54) MINIATURE BEND SPLICE IN OPTICAL FIBERS AND METHOD OF FORMING SAME

(75) Inventors: Colm V. Cryan, Arlington, MA (US); Frederick J. Gillham, Westborough, MA (US); Gregory B. Papazian, Worcester, MA (US); David W. Stowe, Milford, MA (US)

(73) Assignee: Alcoa Fujikura Ltd., Franklin, TN (US)

( * ) Notice: Subject to any disclaimer, the term of this patent is extended or adjusted under 35 U.S.C. 154(b) by 98 days.

(21) Appl. No.: 09/634,205

(22) Filed: Aug. 9, 2000

Related U.S. Application Data
(60) Provisional application No. 60/148,375, filed on Aug. 11, 1999.

(51) Int. Cl.⁷ .............................................. G02B 6/255
(52) U.S. Cl. ............................. 385/96; 385/95; 385/98; 385/99
(58) Field of Search ............................. 385/96, 95, 98, 385/99

(56) References Cited

U.S. PATENT DOCUMENTS

| | | | | |
|---|---|---|---|---|
| 4,900,114 A | * | 2/1990 | Mortimore | 385/96 |
| 5,074,633 A | * | 12/1991 | Cohen | 385/43 |
| 5,138,676 A | * | 8/1992 | Stowe | 385/32 |
| 5,216,736 A | | 6/1993 | Essert | |
| 5,452,393 A | * | 9/1995 | Stowe | 385/123 |

FOREIGN PATENT DOCUMENTS

EP    0 301 840 A2 A3    2/1989

* cited by examiner

*Primary Examiner*—John Juba, Jr.
*Assistant Examiner*—Leo Boutsikaris
(74) *Attorney, Agent, or Firm*—Stanley M. Schurgin; Tracey D. Beiriger

(57) ABSTRACT

A fiber optic device for changing direction along a fiber optic path is provided. A first optical fiber having a first end portion, and a second optical fiber having a second end portion are joined at a fusion splice. A miniature bend is formed in the region of the fusion splice. The device is particularly useful for routing optical fibers in the field. A method of forming such a miniature bend in a fusion splice region between two optical fibers is also provided.

15 Claims, 2 Drawing Sheets

MINIATURE BEND SPLICE IN OPTICAL FIBERS AND METHOD OF FORMING SAME

CROSS REFERENCE TO RELATED APPLICATIONS

This application claims the benefit under 35 U.S.C. §119 (e) of U.S. Provisional Application Nos. 60/148,375, filed on Aug. 11, 1999, the disclosure of which is incorporated by reference herein.

STATEMENT REGARDING FEDERALLY SPONSORED RESEARCH OR DEVELOPMENT

N/A

BACKGROUND OF THE INVENTION

A common way of permanently joining optical telecommunications fibers is with a fusion splice, thereby forming a continuous glass strand. The splice is formed by carefully removing the protective polymer buffer that surrounds the fibers near the ends to be spliced. The bare fiber ends are cleaved and cleaned. The end faces of the fibers are placed in contact, and the fibers are fused together with heat from a torch or electric arc. This type of splice provides robust low loss transmission between the spliced segments. In the splice region, the fiber may be recoated to protect the bare glass or it may be packaged in a surrounding protective housing.

This type of splice has, however, several disadvantages. The protective splice housing is typically long. Some splice packages are as long as 2.375 inches in length. In addition, the fiber emerges from both ends of the splice package. Because the recommended bend radius of the fiber is approximately one inch, it may be necessary to leave as much as an additional inch at each end of the splice package to allow the fibers to bend into another direction.

This combination of long splice package, large bend radius of the fiber, and emergence of the fiber from both ends of the housing may cause difficulty in packaging splices compactly. For example, if it is desired to splice together the pigtails from two fiber optic splitters, each of which may reside in a package more than two inches in length, the splice may add an additional three or four inches to the overall length to allow for bends and pigtails from the components. The end to end length of two spliced splitters can easily be ten inches or more. See FIG. 5. To accommodate this inconveniently long length, the fibers are often coiled in a box, as shown in FIG. 6. This configuration results in a lesser overall length, but a greater overall area.

As noted above, a turn or bend in an optical fiber typically requires a bend radius of 2 cm or more to avoid light loss and maintain a useful longevity in an unprocessed bent fiber. It is also known that this radius may be substantially reduced to as little as $50\mu$ using a miniature bend. To form a miniature bend, the diameter along a length of bare fiber is reduced to as little as $1\mu$, by, for example, drawing, etching, or a combination thereof. In the reduced diameter region, the fiber conducts light by internal reflection at least partially due to the difference in index of refraction at the interface between the fiber and the surrounding environment, generally air. Thus, in this region, the fiber may be bent with no substantial light loss from the bend. See U.S. Pat. Nos. 5,138,676 and 5,452,393, the disclosures of which are incorporated by reference herein.

SUMMARY OF THE INVENTION

The present invention provides a fiber optic device having a miniature bend splice for changing direction along a fiber optic path in a compact space.

More particularly, the device comprises a first optical fiber having a first end portion and a second optical fiber having a second end portion. The first end portion and the second end portion are joined at a fusion splice in a fusion splice region. A miniature bend is formed in at least a portion of the fusion splice region that has a diameter reduced to less than a diameter of the first optical fiber and the second optical fiber and is capable of transmitting light with substantially less light loss due to bending than an unreduced fiber portion. The splice and bend are preferably housed in a suitable support structure or packaging. In this manner, the bend provides a change of direction between the first optical fiber and the second optical fiber in a compact space.

The fusion splice and miniature bend fiber optic device is particularly useful in the routing of optical fibers in the field. Often, the technician laying new optical fiber or repairing existing fibers must determine or accommodate an appropriate and efficient routing in the field and must bend the fibers as necessary to achieve this routing. The present invention allows the technician to splice two fibers and then bend the splice region to a desired angle in the field so that the fiber heads in the desired direction. The device is also particularly useful in combination with two fiber optic splitters that must be spliced together. The combination of two splitters and a miniature bend splice may be housed in a highly compact package.

DESCRIPTION OF THE DRAWINGS

The invention will be more fully understood from the following detailed description taken in conjunction with the accompanying drawings in which.

DETAILED DESCRIPTION OF THE INVENTION

Figure 1:
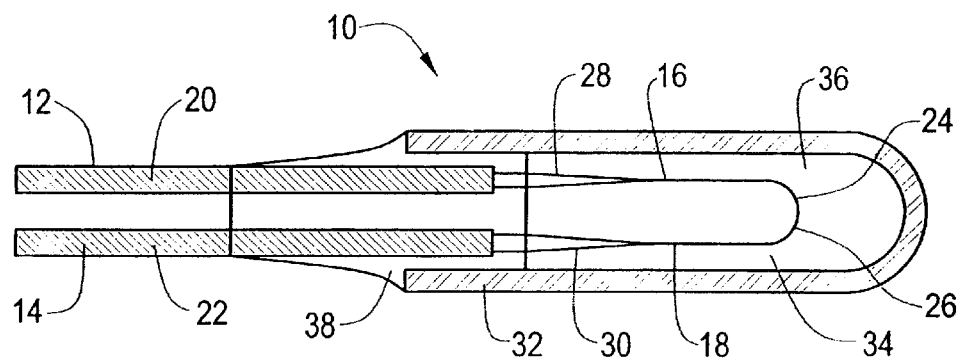
FIG. 1 is a cross-sectional view of a 180° miniature bend and splice according to the present invention.

A fiber optic device 10 having a fusion splice and a miniature bend according to the present invention is illustrated in FIG. 1. The device 10 is formed with two optical fibers 12, 14, having ends 16, 18 from which the polymer buffers or jackets 20, 22, have been removed. The fibers are joined by a fusion splice in a splice region 24. The miniature bend 26 is formed in at least a portion of the splice region having a reduced diameter.

The splice between the two fibers 12, 14 may be formed using conventional fusion splice technology with known fusion splice equipment. Thus, the fiber ends are cleaved and cleaned. The fiber ends are aligned and placed with their end faces in contact. The fibers are then joined by heating the fusion region, for example, using a torch or electric arc.

Next, the diameter within the fusion splice region 24 is reduced to an appropriate diameter to achieve a miniature bend with minimum light loss. The diameter is preferably reduced by heating the splice region and drawing the fiber down to the desired diameter. The draw may be performed by the fusion splice equipment. The draw parameters, such as arc current and duration, are adjusted as necessary to achieve the desired draw, which can be readily determined by those of ordinary skill in the art. The draw typically includes a ramp up to a desired current, a steady state while the draw occurs, and a ramp down as the diameter decreases to prevent melting of the fiber. Typically, the draw reduces the diameter of the fiber from, for example, $125\mu$ to a diameter sufficient to minimize loss of the optical energy in the bend, preferably approximately $15\mu$. The draw may occur immediately after the fusion splice while the fiber is still heated, or the fiber may be allowed to cool down before performing the draw. The diameter may also be reduced by etching or a combination of drawing and etching if desired. Preferably, straight tapered transition regions 28, 30 are left on each side between the fusion splice region.

The bend 26 is formed in the reduced diameter region in any suitable manner known in the art. Alternatively, the fusion splice equipment may include a suitable movable support to bend one fiber over to the appropriate angle. After bending, the bend is annealed at a low temperature to relieve stresses in the bend region, as is known in the art. For example, the fusion splice equipment may be operated at low current while the bend is still retained therein.

Figure 2:
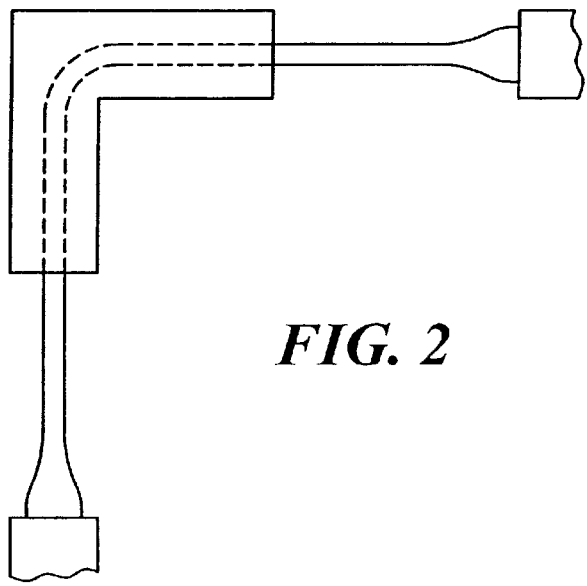
FIG. 2 is a plan view of a 90° miniature bend and splice.
Figure 3:
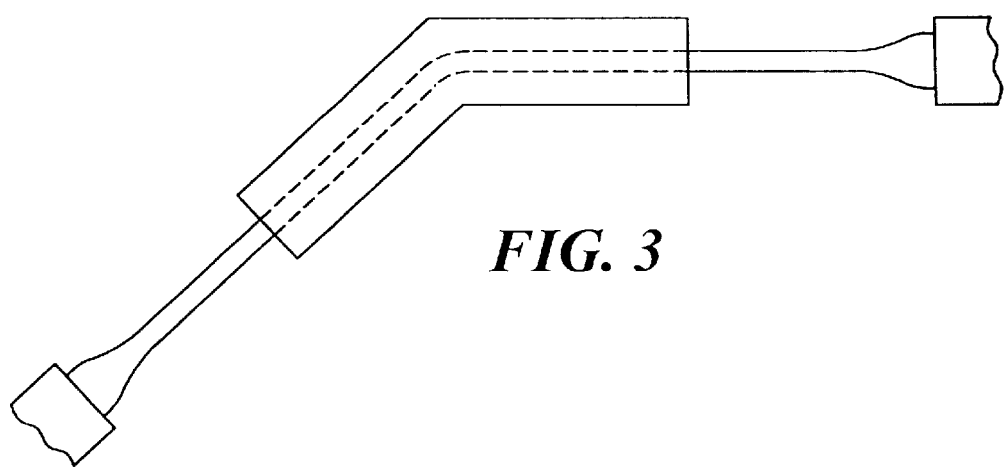
FIG. 3 is a plan view of a 45° miniature bend and splice.

The particular bend angle may be chosen as necessary for the particular application. In FIG. 1, the direction of the fused fibers is reversed, so that one of the fibers is folded back over the other fiber in a substantially 180° bend. Thus, the two fibers are parallel or substantially parallel and extend adjacent or close to each other along parallel or substantially parallel axes. Other bend angles may be provided, however. For example, FIG. 2 illustrates a bend angle of 90°, and FIG. 3 illustrates a bend angle of 45°.

The splice and bend are preferably supported by a suitable support structure or housing 32, such as in a channel 34 formed in a substrate 36. The two fibers may be retained within the channel by a suitable adhesive 38, as known in the art. The bend is preferably supported so that it does not touch the sides of the substrate, which would degrade the optical performance therein.

Figure 4:
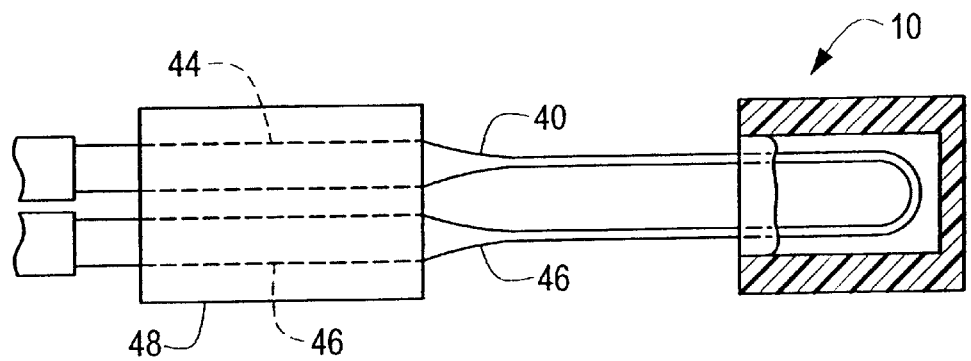
FIG. 4 is partial cross-sectional view of a 180° miniature bend and splice in combination with two splitters.
Figure 5:
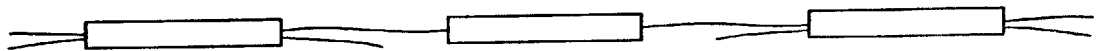
FIG. 5 is a prior art combination of two 2×2 splitters and a splice.
Figure 6:
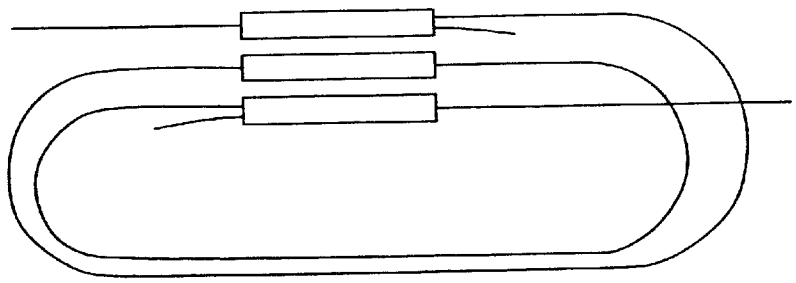
FIG. 6 is a prior art combination of two 1×2 splitters and a splice packaged in a coiled configuration.

The bent splice 10 may be formed with the pigtails 40, 42, from two splitters 44, 46, as shown in FIG. 4. The two splitters may be retained within a single housing 48. The combination of the two splitters and the bent splice may be further housed within a rigid protective shield (not shown) if desired. As is apparent, the entire package of two splitters and the bent splice occupies less area and is substantially shorter than the known prior art splitter/splice/splitter combinations shown in FIGS. 5 and 6.

The fusion splice and miniature bend combination is also particularly useful in the routing of optical fibers in the field. Often, the technician laying new optical fiber or repairing existing fibers must determine or accommodate an appropriate and efficient routing in the field and must bend the fibers as necessary to achieve this routing. The present invention allows the technician to splice two fibers and then bend the splice region to a desired angle in the field so that the fiber heads in the desired direction.

The invention is not to be limited by what has been particularly shown and described, except as indicated by the appended claims.

We claim:

1. A fiber optic device for changing direction alone a fiber optic path, comprising:

a first optical fiber having a first end portion, and a second optical fiber having a second end portion, the first end portion and the second end portion joined at a fusion splice in a fusion splice region; and a bend formed and annealed in the fusion splice region, a support structure having an open end and defining an interior within which the bended fusion splice region is secured, the fusion splice region including a portion having a diameter reduced to less than a diameter of the first optical fiber and the second optical fiber and operative to transmit light with substantially less light loss due to bending than an unreduced fiber portion, the bend providing a change of direction between the first optical fiber and the second optical fiber.

2. The fiber optic device of claim 1, wherein the change of direction is an angle up to 180°.

3. The fiber optic device of claim 1, wherein the bend provides a reversal of direction between the first optical fiber and the second optical fiber.

4. The fiber optic device of claim 1, wherein the bend has a radius of curvature selected to minimize loss of optical energy in the bend.

5. The fiber optic device of claim 1, further comprising a buffer covering the first optical fiber and the second optical fiber spaced from the bend.

6. The fiber optic device of claim 1, wherein the diameter of the portion of the fusion splice region is reduced by etching, drawing, or a combination of etching and drawing.

7. The fiber optic device of claim 1, wherein the diameter of the portion of the fusion splice region is sufficiently reduced to minimize loss of optical energy in the bend.

8. The fiber optic device of claim 1, further comprising a substrate material contained within said support structure, a channel formed in the substrate material and receiving the bended fusion splice region such that the splice region does not contact an interior channel wall associated with the support structure.

9. The fiber optic device of claim 1, further comprising two fiber optic splitters, wherein the first optical fiber comprises a pigtail from one of the two fiber optic splitters and the second optical fiber comprises a pigtail from another of the two fiber optic splitters.

10. The fiber optic device of claim 9, wherein the change of direction is an angle up to 180°.

11. A method of forming a fiber optic device having a change of direction along a fiber optic path, comprising:

providing a first optical fiber having a first end and a second optical fiber having a second end;

fusing the first end and the second end to form a fusion splice in a fusion splice region;

reducing the diameter of at least a portion of die fusion splice region to a diameter less than a diameter of the first optical fiber and the second optical fiber and operative to transmit light with substantially less light loss due to bending than an unreduced optical fiber;

bending the portion of the fusion splice region to form a bend;

annealing the bent portion of the fusion splice region; and encasing the fusion splice region within a support structure in a manner such that the splice region does not contact an interior channel wall associated with the support structure.

12. The method of claim 11, wherein the reducing step further comprises drawing, etching, or a combination of drawing and etching the fusion splice region.

13. The method of claim 11, further comprising supporting the fusion splice region and the bend on a substrate contained within the support structure anti creating the interior channel wall.

14. A fiber optic device for changing direction along a fiber optic path, comprising:

a first optical fiber having a first end portion, and a second optical fiber having a second end portion, the first end portion and the second end portion joined at a fusion splice in a fusion splice region; and a bend formed in the fusion splice region and annealed therein, a support structure having an open end and defining an interior within which said bended fusion splice region is secured, the fusion splice region including a portion having a diameter reduced to less than 12% of a diameter of the first optical fiber and the second optical fiber, the bend formed in the fusion splice region being operative to transmit light with substantially less light loss due to bending than an unreduced fiber portion, the bend providing a change of direction between the first optical fiber and the second optical fiber.

15. A fiber optic device for changing direction along a fiber optic path, comprising:

a first optical fiber having a first end portion, and a second optical fiber having a second end portion, the first end portion and the second end portion joined at a fusion splice in a fusion splice region; and a bend formed in the fusion splice region and annealed therein, the fusion splice region including a portion having a diameter reduced to less than a diameter of the first optical fiber and the second optical fiber and operative to transmit light with substantially less light loss due to bending than an unreduced fiber portion, the bend providing a change of direction between the first optical fiber and the second optical fiber;

a housing having a channel formed therein, the channel including an interior channel wall, the bend formed in fusion splice region being disposed in the channel such that the bend does not physically contact the interior channel wall, wherein no additional losses are incurred.

* * * * *